(12) United States Patent
    Wein

(10) Patent No.: US 9,474,137 B1
(45) Date of Patent: Oct. 18, 2016

(54) SUBSTRATE WITH LIGHTING EFFECT

(71) Applicant: Michael Wein, Houston, TX (US)

(72) Inventor: Michael Wein, Houston, TX (US)

( * ) Notice: Subject to any disclaimer, the term of this patent is extended or adjusted under 35 U.S.C. 154(b) by 0 days.

(21) Appl. No.: 14/797,034

(22) Filed: Jul. 10, 2015

Related U.S. Application Data

(63) Continuation-in-part of application No. 14/250,074, filed on Apr. 10, 2014, now Pat. No. 9,109,763, which is a continuation of application No. 13/366,243, filed on Feb. 3, 2012, now Pat. No. 9,111,184, which is a continuation-in-part of application No. PCT/US2010/043839, filed on Jul. 30, 2010, which is a continuation of application No. 12/534,813, filed on Aug. 3, 2009, now Pat. No. 8,006,899.

(51) Int. Cl.
| | |
|---|---|
| G06F 1/16 | (2006.01) |
| H05B 37/02 | (2006.01) |
| G06K 19/07 | (2006.01) |
| G06Q 20/10 | (2012.01) |
| G06Q 20/40 | (2012.01) |
| G06Q 20/32 | (2012.01) |

(52) U.S. Cl.
CPC ......... H05B 37/029 (2013.01); G06K 19/0717 (2013.01); G06Q 20/10 (2013.01); G06Q 20/3278 (2013.01); G06Q 20/401 (2013.01); H05B 37/0272 (2013.01)

(58) Field of Classification Search
CPC .............................. H04W 4/203; H04W 4/206
See application file for complete search history.

(56) References Cited

U.S. PATENT DOCUMENTS

| | | | | |
|---|---|---|---|---|
| 5,218,629 A * | 6/1993 | Dumond, Jr. .... | G08G 1/096716 | |
| | | | | 340/904 |
| 6,404,409 B1 | 6/2002 | Solomon | | |
| 6,965,205 B2 * | 11/2005 | Piepgras | ............ | H05B 33/0857 |
| | | | | 315/292 |
| 7,011,435 B1 | 3/2006 | Blaymore | | |
| 7,614,771 B2 | 11/2009 | McKechnie et al. | | |
| 8,006,899 B2 | 8/2011 | Wein | | |
| 8,740,391 B2 | 6/2014 | Leclerc et al. | | |
| 2001/0018660 A1 | 8/2001 | Sehr | | |
| 2001/0040591 A1 * | 11/2001 | Abbott | .................... | G06F 1/163 |
| | | | | 715/700 |
| 2005/0188167 A1 | 8/2005 | Squibbs et al. | | |
| 2006/0089793 A1 * | 4/2006 | Rudow | .................. | G01C 21/20 |
| | | | | 701/532 |
| 2006/0176689 A1 | 8/2006 | Dowdy et al. | | |
| 2006/0244435 A1 | 11/2006 | Watanabe et al. | | |
| 2007/0195544 A1 | 8/2007 | Graves, Jr. | | |
| 2007/0255620 A1 * | 11/2007 | Tumminaro | ........... | G06Q 20/10 |
| | | | | 705/14.27 |
| 2008/0020753 A1 * | 1/2008 | Glass | .................... | G06F 1/1626 |
| | | | | 455/425 |
| 2008/0306826 A1 * | 12/2008 | Kramer | .................. | G06Q 30/02 |
| | | | | 705/14.14 |
| 2009/0289956 A1 * | 11/2009 | Douris | ............... | G01C 21/3602 |
| | | | | 345/633 |
| 2011/0035445 A1 * | 2/2011 | Eickhoff | ................ | G06Q 10/10 |
| | | | | 709/204 |
| 2011/0058363 A1 | 3/2011 | Fattizzi | | |
| 2011/0081922 A1 * | 4/2011 | Chandra | ............ | H04W 64/006 |
| | | | | 455/457 |

* cited by examiner

*Primary Examiner* — Dedei K Hammond
(74) *Attorney, Agent, or Firm* — Buskop Law Group, PC; Wendy Buskop

(57) ABSTRACT

A networked collaborative lighting effect system for an event at a venue, having a plurality of portable collaborative lighting devices in communication with the network. Each portable collaborative lighting device can be configured to be attached to at least one of: a member of the audience an object, a fixture or combinations thereof. Each portable collaborative lighting devices comprising an active or passive RFID chip for encoding wearer information including financial information. Each collaborative lighting effect system having a plurality of lights connected to a power supply and the collaborative lighting effect system further having a processor connected to the network to receive commands from the network, which can include commands from a DJ connected to the network at the venue.

21 Claims, 10 Drawing Sheets

FIGURE 4A

| | |
|---|---|
| DEVICE PROCESSOR | 20 |
| DEVICE DATA STORAGE | 21 |
| COMPUTER INSTRUCTIONS TO INSTRUCT THE DEVICE PROCESSOR TO OPERATE AT LEAST ONE LIGHTING DEVICE IN A PREDETERMINED SEQUENCE | 22 |
| COMPUTER INSTRUCTIONS TO INSTRUCT THE DEVICE PROCESSOR TO OPERATE AT LEAST ONE LIGHTING DEVICE USING A BASE MUSIC FREQUENCY | 37 |
| COMPUTER INSTRUCTIONS TO INSTRUCT THE DEVICE PROCESSOR TO OPERATE AT LEAST ONE LIGHTING DEVICE USING A TREBLE MUSIC FREQUENCY | 39 |
| COMPUTER INSTRUCTIONS TO INSTRUCT THE DEVICE PROCESSOR TO OPERATE AT LEAST ONE LIGHTING DEVICE USING A SEQUENCE OF PITCHES | 41 |
| COMPUTER INSTRUCTIONS TO INSTRUCT THE DEVICE PROCESSOR TO OPERATE AT LEAST ONE LIGHTING DEVICE USING A DRUMBEAT SEQUENCE | 43 |
| COMPUTER INSTRUCTIONS TO DETECT A PLURALITY OF PORTABLE COLLABORATIVE LIGHTING DEVICES WITHIN A PRESET DISTANCE | 100 |
| COMPUTER INSTRUCTIONS TO SYNCHRONIZE THE DETECTED PLURALITY OF PORTABLE COLLABORATIVE LIGHTING DEVICES INTO A CROWD MAP | 102 |
| CROWD MAPS | 105 |
| PLURALITY OF STATIC GRAPHIC PATTERNS | 120 |
| PLURALITY OF STATIC TEXT MESSAGES | 121 |
| PLURALITY OF MOVING GRAPHIC PATTERNS | 122 |
| PLURALITY OF MOVING TEXT MESSAGES | 123 |
| PLURALITY OF VIDEOS | 124 |
| COMPUTER INSTRUCTIONS TO INSTRUCT THE DEVICE PROCESSOR TO PULSE AT LEAST ONE LIGHTING DEVICE USING A REAL TIME LIGHT PULSING SEQUENCE CREATED DURING AN EVENT PROVIDED FROM AN EVENT PROCESSOR WITH EVENT DATA STORAGE CONNECTED TO THE NETWORK | 126 |
| COMPUTER INSTRUCTIONS TO DETECT FREQUENCY SEQUENCES EMITTED FROM ANOTHER PORTABLE COLLABORATIVE LIGHTING DEVICE USING AT LEAST ONE SENSOR | 134 |
| COMPUTER INSTRUCTIONS TO PROVIDE DIFFERENT PREPROGRAMED LIGHTING SEQUENCES TO THE PLURALITY OF PORTABLE COLLABORATIVE LIGHTING DEVICES SIMULTANEOUSLY | 154 |
| COMPUTER INSTRUCTIONS TO ENABLE A GRAPHIC IMAGE, TEXT MESSAGE, OR VIDEO TO MOVE FROM A FIRST LOCATION ON THE CROWD MAPS TO A SECOND LOCATION ON AT LEAST ONE OF THE CROWD MAPS | 156 |
| COMPUTER INSTRUCTIONS TO DETERMINE A LOCATION OF AN INDIVIDUAL PORTABLE COLLABORATIVE LIGHTING DEVICE IN MEASUREABLE UNITS TO OTHER INDIVIDUAL PORTABLE COLLABORATIVE LIGHTING DEVICES AT AN EVENT | 162 |
| COMPUTER INSTRUCTIONS TO ADJUST PIXELS OF AT LEAST ONE LIGHTING DEVICE CHANGING A COLOR OR A LIGHT INTENSITY OF THE INDIVIDUAL PORTABLE COLLABORATIVE LIGHTING DEVICE WHEN THE INDIVIDUAL PORTABLE COLLABORATIVE LIGHTING DEVICE IS MOVED AT AN EVENT | 164 |
| COMPUTER INSTRUCTIONS TO TURN ON OR OFF LIGHTING DEVICES OF THE SECOND PORTABLE COLLABORATIVE LIGHTING DEVICE IN REAL TIME AT THE EVENT | 170 |

FIGURE 6

| | |
|---|---|
| NETWORK TRANSMITTER | 33 |
| LIGHT BOARD | 175 |
| EVENT PROCESSOR | 130 |
| EVENT DATA STORAGE | 132 |
| CROWD MAPS | 105 |
| DESIGNATED ZONE | 140 |
| PRESET DISTANCE | 142 |
| GEOGRAPHIC DIRECTION | 144 |
| ALTITUDE | 146 |
| RANDOM NUMBER GENERATOR | 147 |
| RANDOM DISTANCE | 148 |
| COMPUTER INSTRUCTIONS FOR PRODUCING A SHIMMER EFFECT USING AT LEAST A PORTION OF THE PORTABLE COLLABORATIVE LIGHTING DEVICES AT THE EVENT | 190 |
| COMPUTER INSTRUCTIONS FOR PRODUCING A CROSS FADE EFFECT USING AT LEAST A PORTION OF THE PORTABLE COLLABORATIVE LIGHTING DEVICES AT THE EVENT | 192 |
| COMPUTER INSTRUCTIONS FOR PRODUCING A WAVE EFFECT USING AT LEAST A PORTION OF THE PORTABLE COLLABORATIVE LIGHTING DEVICES AT THE EVENT | 194 |
| COMPUTER INSTRUCTIONS FOR PRODUCING A FLICKER EFFECT USING AT LEAST A PORTION OF THE PORTABLE COLLABORATIVE LIGHTING DEVICES AT THE EVENT | 196 |
| COMPUTER INSTRUCTIONS FOR PRODUCING A STROBE EFFECT USING AT LEAST A PORTION OF THE PORTABLE COLLABORATIVE LIGHTING DEVICES AT THE EVENT | 198 |
| COMPUTER INSTRUCTIONS FOR GENERATING AT LEAST 8 BIT, FULL COLOR VIDEO AT 30 FRAMES PER SECOND AND TRANSMIT THE VIDEO TO AT LEAST A PORTION OF THE PLURALITY OF THE PORTABLE LIGHTING DEVICES AT THE EVENT | 203 |
| COMPUTER INSTRUCTIONS TO TRANSFER MONEY UNITS FROM A FINANCIAL INSTITUTION ON THE NETWORK TO OTHER PORTABLE COLLABORATIVE LIGHTING DEVICES USING ENCRYPTION TECHNOLOGY WHEN AN RFID TAG, WHETHER ACTIVE OR PASSIVE, PROVIDES COMMANDS | 204 |
| COMPUTER INSTRUCTIONS TO ACTIVATE WHEN AN RFID TAG, WHETHER ACTIVE OR PASSIVE, IS CONFIGURED TO TRANSFER MONEY, THE RFID TAG CONFIGURED TO PERFORM AS A CREDIT CARD, DEBIT CARD, OR CREDIT STORAGE DEVICE HOLDING MONEY EQUIVALENT UNITS FROM A VENUE, IN EXCHANGE OF ACTUAL CASH | 205 |

SUBSTRATE WITH LIGHTING EFFECT

CROSS REFERENCE TO RELATED APPLICATIONS

The present application is a Continuation in Part of co-pending U.S. patent application Ser. No. 14/250,074, filed on Apr. 10, 2014, entitled "ENTRANCE TICKET WITH LIGHTING EFECT", which is a Continuation of co-pending U.S. patent application Ser. No. 13/366,243, filed on Feb. 3, 2012, entitled "ENTRANCE TICKET WITH LIGHTING EFFECT", which is a Continuation in Part of International Application No. PCT/US2010/043839, filed on Jul. 30, 2010, entitled "ENTRANCE TICKET WITH LIGHTING EFFECT," which claims priority to U.S. patent application Ser. No. 12/534,813 filed on Aug. 3, 2009 entitled, "ENTRANCE TICKET WITH LIGHTING EFFECT," which is now issued as U.S. Pat. No. 8,006,899." These references are hereby incorporated in their entirety.

FIELD

The present embodiments generally relate to a plurality of portable collaborative lighting devices and a method of using the plurality of portable collaborative lighting devices.

BACKGROUND

A need exists for a plurality of portable collaborative lighting devices that can provide tracking of admissions, controlling access of admissions, as well as enabling an attendee to interact with an event at a venue, thereby enabling the attendee to become more fully involved in an event.

A need exists for a method of using a dual purpose portable collaborative lighting device that can provide tracking of admissions, controlling access of admissions, as well as enabling a portable collaborative lighting device holder to interact with an event at the venue, thereby enabling the portable collaborative lighting device holder to become more fully involved in an event.

The present embodiments meet these needs.

BRIEF DESCRIPTION OF THE DRAWINGS

The detailed description will be better understood in conjunction with the accompanying drawings as follows:

FIGS. 4A and 4B depict the device processor with the device data storage of the plurality of portable collaborative lighting devices.

FIG. 6 depicts a diagram of an event processor and an event data storage.

Figure 1A:
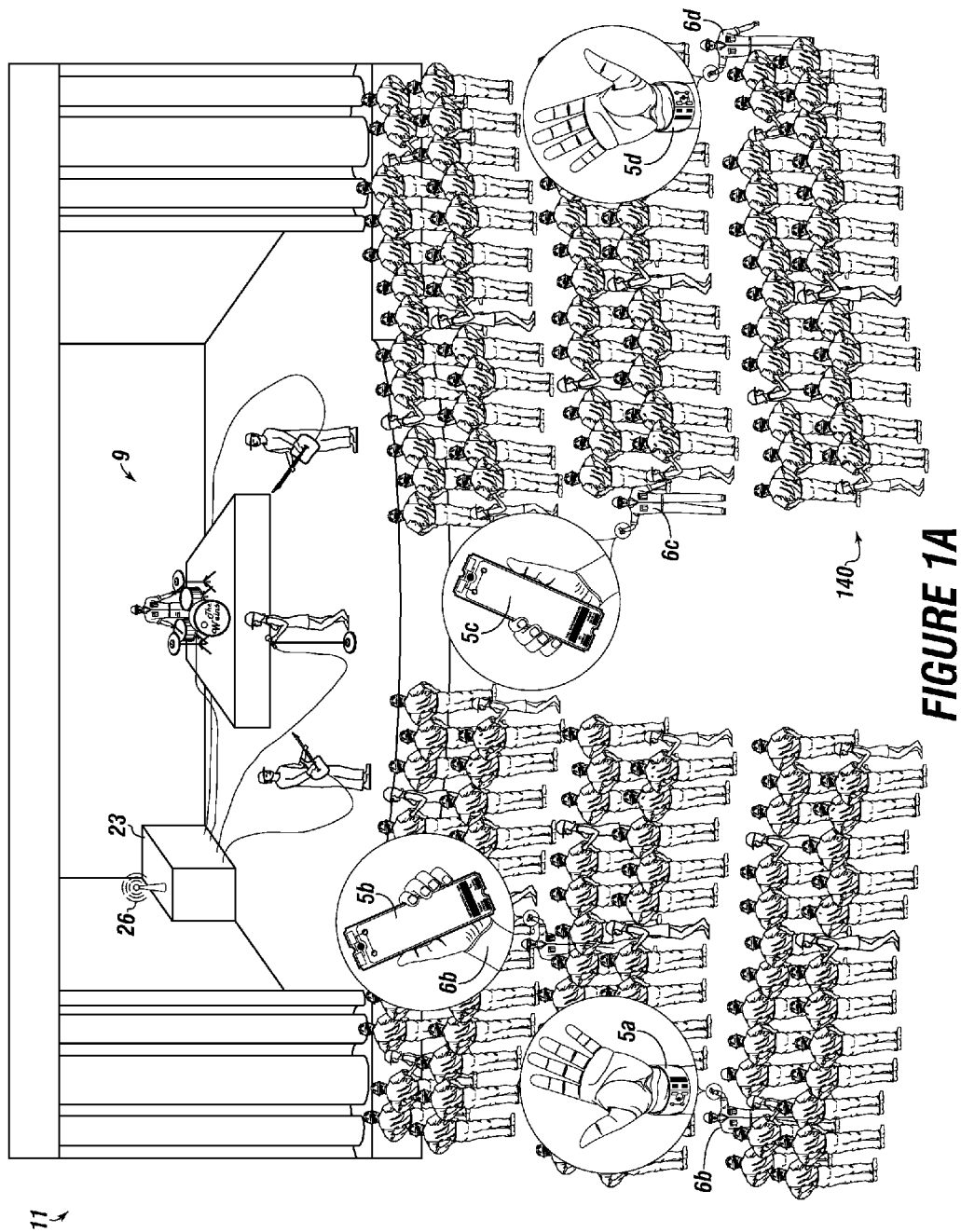
FIG. 1A depicts a venue with a plurality of portable collaborative lighting devices for the lighting effect contained in it.

The present embodiments are detailed below with reference to the listed Figures.

DETAILED DESCRIPTION OF THE EMBODIMENTS

Before explaining the apparatus and method in detail, it is to be understood that the apparatus and method are not limited to the particular embodiments and that the invention can be practiced or carried out in various ways.

The present embodiments relate to a plurality of portable collaborative lighting devices and method for creating a lighting effect in a venue.

In embodiments, at least one of the plurality of portable collaborative lighting devices can be used to provide admission to a venue and to create a lighting effect synchronized with other audience members, enabling the holder to gain admission to the venue and to participate with an event at the venue.

The method can include providing at least one of the plurality of portable collaborative lighting devices for creating a lighting effect in the venue. The plurality of portable collaborative lighting devices can include a substrate. The substrate can be any material. The plurality of portable collaborative lighting devices can have a power source embedded in the substrate.

At least one of a plurality of portable collaborative lighting devices can be configured to provide a lighting effect. The lighting effect can have a steady glow at a fixed intensity, a variably intensity, a flicker on and off, a change of colors, a smooth flow, or other predetermined lighting effects.

Accordingly, the method can include causing manipulation of the plurality of portable collaborative lighting devices to create the lighting effect. The manipulation of the plurality of portable collaborative lighting devices can be caused by telemetry, of any kind known in the art, interacting with a processor configured to control the plurality of portable collaborative lighting devices. The manipulation of the plurality of portable collaborative lighting devices can cause the lighting effect. For example, a signal can be sent to the processor in communication with the plurality of portable collaborative lighting devices to cause the plurality of portable collaborative lighting devices to alternate between a first color and a second color. In the illustration, the signal can interact with the processor causing manipulation of the plurality of portable collaborative lighting devices to produce an image. The manipulation of the plurality of portable collaborative lighting devices can cause any desired lighting effect.

In one or more embodiments, the causing of the manipulation of the lighting effect can be configuring a processor in communication with the plurality of portable collaborative lighting devices to manipulate the plurality of portable collaborative lighting devices to provide a predetermined lighting effect in accordance with a specific instrument being played. For example, the processor can manipulate the plurality of portable collaborative lighting devices to provide a lighting effect of a flashing light that flashes in correlation to beats of a drum.

In one or more embodiments, the method can include providing a first set of portable collaborative lighting devices to a first set of attendees, and providing a second set of portable collaborative lighting devices to a second set of attendees. The method can also include manipulating the lighting effect of the first set of portable collaborative lighting devices according to sound emitted from a first instrument, and manipulating the lighting effect of the second set of portable collaborative lighting devices according to sound emitted from a second instrument.

The term "event" as used herein can refer to a controlled access event or some other type of event, such as a concert or a festival, but is not limited to any such event, and can include a political gathering, a sporting event, or an athletic meet.

The term "event venue" as used herein can refer to the location that an event is occurring including the parking lots associated with the event venue.

The term "fixture" as used herein can refer to a non-moving element at the performance/event venue. A fixture can be a stage wall, another wall at the venue, a fixed light, a door, a curtain, or even the ground at the event venue. Fixtures can include a store at the venue, a restaurant at the venue, liquor stations at the venue, beer stations at the venue, lounges at the venue, entry gates, turnstiles, and entrance ways. Fixtures can also include ceiling fans, lamp posts, scoreboards, and goal posts.

The term "object at an event" as used herein can refer to a movable object at an event venue. The object can be a movable stage, movable seats and chairs, movable bar carts or similar objects. Objects at the event can include movable beer stations, movable liquor stations, portable toilets, shoes, sandals, shirts, hats, clothing, and banner. Objects can also include safety equipment such as earplugs, safety vests, safety cones, and barricades. Other objects can include balls, beach balls, balloons, flying discs, orbs, lanyards, apparel, signage, drones, and blimps.

The term "proximity sensor" as used herein can refer to a device that is able to detect the presence of nearby objects without any physical contact. A proximity sensor often emits an electromagnetic field or a beam of electromagnetic radiation (infrared, for instance), and looks for changes in the field or return signal. The object being sensed is often referred to as the proximity sensor's target. An example of a proximity sensor working is a hotel card key that you wave in front of the reader to unlock your room's door.

The term "telemetry sensor" as used herein can refer to a component used to remotely measure any quantity, allowing you to monitor and record performance data.

The term "contact sensor" as used herein can refer to an electromagnetic device that detects change through direct physical contact with the target object. Contact sensors typically do not require power.

The term "orientation sensor" as used herein can refer to a component used to determine spatial orientation by reporting yaw (azimuth), pitch and roll.

The plurality of portable collaborative lighting devices can be an item passed out at the venue, a ticket to the venue, or the like.

In one or more embodiments, the plurality of portable collaborative lighting devices can be a sticker passed out at the venue that can be attached to a substrate that was provided with the ticket and configured to connect with the power source in the substrate.

In one or more embodiments, the power source can be a sticker passed out at the venue and configured to connect with the plurality of portable collaborative lighting devices on the substrate. The substrate can be the ticket or the like.

The plurality of portable collaborative lighting devices can create a synchronously presented lighting effect from an audience in the venue, such as a music theater or a concert hall, during an event.

In embodiments, each of the plurality of portable collaborative lighting devices can have a substrate with a first side for supporting a readable identification code and a second side for supporting a marketing message such as "don't smoke" or "danger high decibels expected." In embodiments, the substrate can have a thickness less than about 0.4 inches, can weigh less than about 2 ounces, and can be flexible.

The identification code can be a bar code, a numerical code, an alphanumeric code, a radio frequency identification "RFID" tag, or a series of "check digits" used to verify an identification code, which is known in the warehouse packing industry.

A power source can be disposed or embedded within the substrate, such as a small camera battery or other battery. The power source can be from about 1 volt to about 9 volts and can originate from a battery such as a hearing aid battery, a printable battery, a watch battery, a lithium ion battery, a rechargeable battery, a solar battery, or any other commercially available battery.

Any number of the plurality of portable collaborative lighting devices can be electrically connected to the power source for use during an event. At least one of the plurality of portable collaborative lighting devices can be anything capable of emitting light. For example, the at least one plurality of portable collaborative lighting devices can be a light emitting diode "LED", an organic light-emitting diode "OLED", a luminescent, or the like. The plurality of portable collaborative lighting devices can have a plurality of pixels, lines, or any intensity.

A controller with a processor and a data storage can be disposed in the substrate. The processor can be in communication with the data storage and can further be in electrical communication with the power source and at least one of the plurality of portable collaborative lighting devices.

The term "data storage" refers to a non-transitory computer readable medium, such as a hard disk drive, solid state drive, flash drive, tape drive, and the like. The term "non-transitory computer readable medium" excludes any transitory signals but includes any non-transitory data storage circuitry, e.g., buffers, cache, and queues, within transceivers of transitory signals.

In embodiments, a plurality of computer instructions can be stored in the data storage, which can be used to instruct the processor to do various tasks.

In embodiments, computer instructions can be stored in the data storage, which can be used to instruct the processor to operate the lights in a predetermined sequence. The processor can be activated by a musical beat, a melody, a pitch line, or the processor can activate as a reaction to an event on the stage of the venue. The data storage can be a flash memory. The processor can be a microprocessor.

In embodiments, at least one of the plurality of portable collaborative lighting devices can have an actuator associated with the substrate, which can be embedded in the substrate for initiating flashing of the lights based on a predetermined set of computer instructions which determine how the lights flash, including the sequence of the flashing.

The actuator can be in direct communication with the processor. The actuator can be a sound receiver which can receive a sound from the stage or a signal from an event transmitter and can then initiate the lighting effect. The signal from an event transmitter can be referred to herein as a first signal.

The sound receiver can be a microphone or any other commercially available sound receiver.

In embodiments, at least one of the plurality of portable collaborative lighting devices can have an actuator that is a pull tab or a button, which can be disposed at least partially in the substrate acting as a separator between the power source and the processor, so that when the pull tab is removed a connection between the processor and the power source is formed such that the processor can receive power and can utilize the computer instructions in the data storage, which can determine the sequence of the lighting effect.

In operation, the pull tab can be torn off of the substrate, thereby establishing a circuit between the power source and the processor and sending a signal to initiate the processor. The pull tab can initially be disposed between the power source and the processor, thereby disrupting any electronic signal from communicating between the power source and the processor. Upon removal of the pull tab from the substrate, the pull tab will no longer be disrupting any electronic signal between the power source and the processor, allowing the processor to be initiated.

In an embodiment, the pull tab can be created on a tear tab, such as a perforated ticket stub. The tear tab can be removed from each of the plurality of portable collaborative lighting devices or substrate by tearing the tear tab from each of the plurality of portable collaborative lighting devices or substrate along the perforation. As the tear tab is removed from the substrate, the pull tab is simultaneously removed from the substrate, thereby establishing electrical communication between the power source and the processor. In this manner, the tear tab cannot be reattached to the substrate, thereby ensuring that each of the plurality of portable collaborative lighting devices is only usable for one event.

In an embodiment, the actuator can initiate the processor when it receives a second signal from a network transmitter connected to a network to start the lighting sequence or to change a lighting sequence that has been started.

Alternatively, a switch, such as an electronic on/off switch, can be embedded in the substrate or attached to the surface of the substrate. The switch can mechanically initiate the light individually or can initiate the flashing light sequence.

In embodiments, combinations of actuators can be usable in the plurality of portable collaborative lighting devices.

In another embodiment, the plurality of portable collaborative lighting devices can be actuated by passing the device in front of a magnet mounted at the entry gates. This action can cause the ferromagnetic material in each plurality of portable collaborative lighting devices to shift on or shift off as the plurality of portable collaborative lighting devices enters or exits the controlled access venue.

The processor of each of the plurality of portable collaborative lighting devices can operate synchronously to create a lighting effect such as three short flashing lights, followed by two long flashing lights, followed by three short light flashes to interact and send a marketing message with music being performed on stage.

Other members or a second group of members of the audience can have different computer instructions, which can flash lights in a counterpoint beat to the first group of members of the audience. Similarly, there can be a third group of members of the audience, which can all have green lights that flash as a group in between the other flashing lights, which can have different colored lights. Additional colors or multicolored lights, such as RGB LED, can be useable with the embodiments.

Simultaneously, the processors for the plurality of portable collaborative lighting devices can synchronously operate during an event while serving the dual purpose of controlling access to the venue. This unique plurality of portable collaborative lighting devices can allow each member of the audience to interactively participate with an event as a member of the audience with the plurality of portable collaborative lighting devices.

In embodiments, each of the plurality of portable collaborative lighting devices can have a flexible substrate, which can be reusable. In an embodiment, the flexible substrate can have a thickness of less than about 1 inch and a weight of less than about 5 ounces.

The substrate can be at least one of: a ticket, a wristband, a ball, eyeglass frames, a balloon, a beach ball, a flag, a sticker, a lantern, a flashlight, a non-powered flying device, a parachute attached to a translucent material, a kite, a self-propelled flying vehicle, a remote controlled land based or water based vehicle, a sprinkler system, a watch, earplugs, ear phones, ear buds, an umbrella, a raincoat, a bottle, a can, a cup, cutlery, a lanyard, a scarf, a towel, a handkerchief, a stuffed animal, a bubble blowing device, a shirt, a jersey, a sweater, a hoodie, pajamas, a hat, a belt, a vest, socks, a headband, sandals, gloves, mittens, shoes, shoe laces, a pompom, a jump rope, a musical instrument, a foam stick, an inflatable stick, jewelry, a key chain, a luggage tag, suspenders, an eyeglass lens, a translucent silicone object, and various other items, and combinations thereof.

The first signal can be an audio signal or a wireless signal. In an embodiment, the audio signal can have a preset frequency limit that represents a bass frequency range, a treble frequency range, a sequence of pitches, or a drum beat sequence to initiate the actuator on each of the plurality of portable collaborative lighting devices.

In embodiments, the audio signal and the wireless signal can come from the network, which can be initiated at a predetermined time.

In an embodiment, the auto signal and the wireless signal can be generated by a user, such as by a disc jockey "DJ", an operator, a sound technician, or similar user, by tapping a beat using a mouse, an IPOD™, an IPHONE™, a tablet computer, a handheld communication device, or another similar device, which can be in communication with the network, such as with a computer, a laptop, a personal digital assistant, a cellular phone, or combinations thereof.

For example, Errin is a DJ that loves being able to share his art with the world, especially at live events. As his set opens, he taps 'shimmer' on his tablet computer that sits alongside his regular DJ setup. The tablet computer can be used to control the lighting effects in real time via preprogrammed lighting sequences. The audience shimmers in blue lights until he drops the beat and taps 'Red Wave' on the tablet computer. Instantly a wave of red lights starts on the plurality of portable collaborative lighting devices nearest the stage and rolls out across the audience, invoking a sense of excitement in the members of the audience and triggering a massive dance party. When Errin's first track ends, he taps the 'sponsor' button on his tablet computer and the audience cheers and claps as the logo of the main festival sponsor, MATE™, is written in lights across the members of the audience. As Errin progresses through his set, he deploys other lighting effects in real time. He seamlessly transitions from an intense flicker to a rainbow of lights chasing themselves across the audience. He finishes his set with everyone wanting more. What an amazing show! It becomes obvious to everyone in attendance that the show is over and that it is time to leave the premises when an arrow pointing to the exit is made by a plurality of portable collaborative lighting devices across the members of the audience, guiding the members of the audience as they safely exit the premises.

In another embodiment, DJ Free Willy uses prerecorded electromagnetic signals to control the lighting effects in real time. Before the show, Willy records 240 different electromagnetic sound bites. Each prerecorded electromagnetic signal can correspond to a different lighting effect, such as a fade, a wave, a blue wash, a red wash, a shimmer, etc. Free Willy has a piece of paper with all the signals printed on them. As he points to each effect on the piece of paper, the instructions for the electromagnetic signal are sent from the smart paper to a controller which causes the electromagnetic sound bites to be played over the speaker system. The members of the audience cannot hear these inaudible electromagnetic frequencies, but the plurality of collaborative lighting effects can hear the sounds, can distinguish between the sounds and can interpret the smart sounds into instructions for a collaborative lighting effect in real time.

In embodiments, the plurality of portable collaborative lighting devices can additionally have an expiration date programmed into the computer instructions in the data storage for deactivating the processor, so that a plurality of portable collaborative lighting devices used for the Beach Boys in New Jersey, on Jun. 22, 2009 cannot be used again to see the Beach Boys in Chicago on Jun. 23, 2009.

In embodiments, the plurality of portable collaborative lighting devices can have a light, such as a light emitting diode (LED), a fluorescent light, a halogen light, a neon light, any commercially available light, or combinations thereof in the substrate.

In embodiments, an electroluminescence coating can be printed on the substrate and can also act as the lighting effect, replacing the light for some uses, and acting in conjunction to the light in other uses. In addition, electroluminescent wire can be used, which can also act as the lighting effect.

If lights are used, the lights can be connected together on the plurality of portable collaborative lighting devices in series, in parallel, or combinations thereof, to the power source.

The substrate of the plurality of portable collaborative lighting devices can be one or more of the following types of items: a stiff paper, a non-forming flexible crystalline plastic, a silicone material, a cardboard sheet, a thin aluminum plate, a flexible metal plate, a rubberized plate, a 2 millimeter thin plate of another flexible shape supporting synthetic material, and combinations thereof.

The power source can be an AAA battery, a DC battery, an AA battery, a lithium ion battery, a solar cell, a watch battery, a hearing aid battery, any other commercially available battery, and combinations thereof. In embodiments, the power source can be rechargeable. In embodiments, the power source can be replaceable.

In embodiments, the power source can be a printable battery, such as one from the Fraunhofer Research Institution for Electronic Nano Systems ENAS, of Germany. This embodiment is environmentally friendly, as the printable battery contains to no mercury.

The substrate can be a wristband, a neck band, head gear, a neck lanyard, a brooch, a T-shirt, sunglasses, earplugs, or another wearable plurality of portable collaborative lighting devices with a lighting device.

In embodiments, the plurality of portable collaborative lighting devices can have a "no reentry" code, which can prohibit reentry of the plurality of portable collaborative lighting devices to the venue.

In embodiments, multiple location access can control capabilities. In this embodiment, the plurality of portable collaborative lighting devices can leave the event and have a "reentry" code allowing for reentry at another venue.

In order to more fully understand the plurality of portable collaborative lighting devices, the plurality of portable collaborative lighting devices can be used as follows: the plurality of portable collaborative lighting devices can be used for gaining access to a venue. In this embodiment, the user can actuate at least one lighting device on the plurality of portable collaborative lighting devices by pulling on a pull tab to complete the circuit allowing power to flow to the plurality of portable collaborative lighting devices. The plurality of portable collaborative lighting devices can receive a first signal from an event transmitter. The first signal can be received by the programmable logic circuit in the plurality of portable collaborative lighting devices and the signal can be matched to computer instructions in the programmable logic circuit to initiate a first sequence of lighting device illumination patterns. The plurality of portable collaborative lighting devices can receive a second signal from a network transmitter connected to a network and actuate a second sequence of lighting patterns. The plurality of portable collaborative lighting devices can synchronously operate with other devices at an event creating a synchronous lighting effect with all devices in an audience of an event.

Turning now to the Figures, FIG. 1A depicts a venue with a plurality of portable collaborative lighting devices for the lighting effect contained in it.

A plurality of portable collaborative lighting devices, 5a, 5b, 5c, and 5d are shown during an event 9 at a venue 11.

The plurality of portable collaborative lighting devices 5a and 5d are shown as wristbands. The plurality of portable collaborative lighting devices 5b and 5c are shown as plastic substrate that looks like a ticket.

In embodiments, each of the plurality of portable collaborative lighting devices can be secured to members of the audience 6a, 6b, 6c, and 6d.

The event 9 can be any kind of performance which can occur on a stage in front of members of the audience 6a, 6b, 6c, and 6d or can be viewable by the members of the audience.

In embodiments, the event can be remote or can be electronically connected to the audience in the manner of live aid concerts. These remote audiences to the show are connected to the live show through a network, such as the internet, much like the academy awards were connected to the massive audience using social networks during the 2014 Academy Awards.

An event transmitter 23 is depicted for transmitting a first signal 26 to the plurality of portable collaborative lighting devices 5a-5d at the venue 11.

In embodiments, the venue can have a designated zone 140 of members of the audience, such as a VIP section based on a preset area, a zone of seats, or a preset list of individual seats.

Figure 1B:
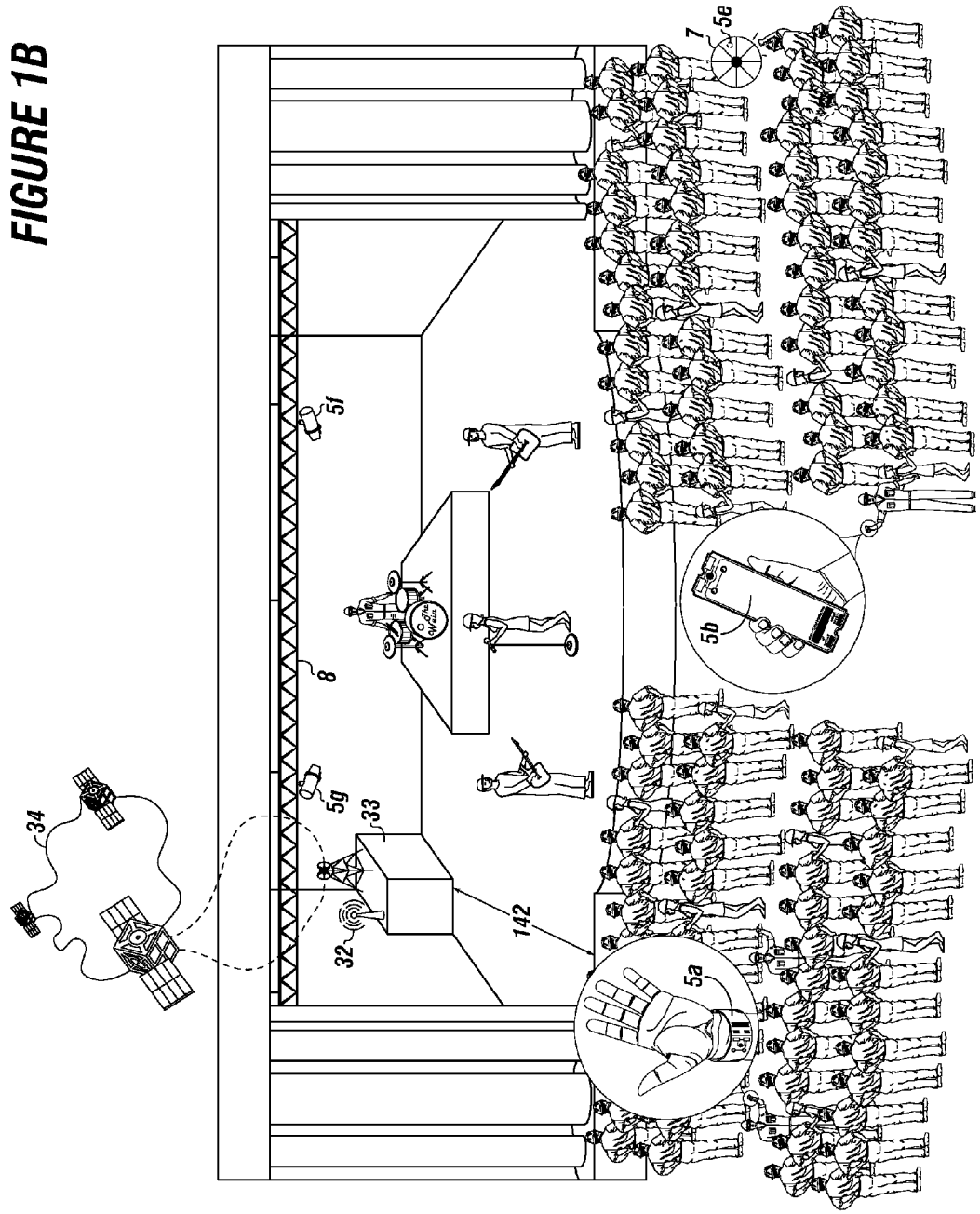
FIG. 1B depicts an alternative embodiment of the venue with the plurality of portable collaborative lighting devices for the lighting effect contained in it.

FIG. 1B depicts an alternative embodiment of the venue with the plurality of portable collaborative lighting devices for the lighting effect contained in it.

A network 34 is shown in communication with a network transmitter 33 for transmitting a second signal 32 to the plurality of portable collaborative lighting devices 5a, 5b, 5e, 5f, and 5g.

In this embodiment, the plurality of portable collaborative lighting devices can be attached to fixtures, or portions of the stage, or moveable objects.

In this embodiment, one of the plurality of portable collaborative lighting devices 5e is attached to an object 7, which is a ball. The portable collaborative light device is shown secured inside the ball, illuminating the ball.

In embodiments, the plurality of portable collaborative lighting devices, such as portable collaborative lighting devices 5f and 5g are shown secured to a fixture 8 which is shown as the light support frame used to hold lights that illuminate the performers at the venue 11.

Additionally the network transmitter 33 can be a preset distance 142 from the plurality of portable collaborative lighting devices, such as 1 foot to 300 feet. The preset distance 142 can be stored in an event data storage, shown in FIG. 6.

Figure 2:
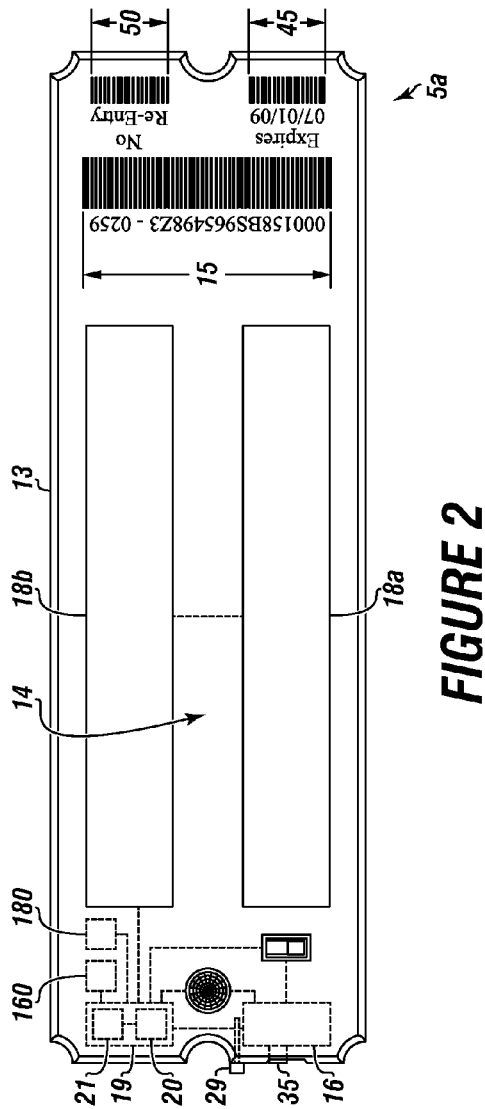
FIG. 2 depicts a front view of one of the plurality of portable collaborative lighting devices.
Figure 3:
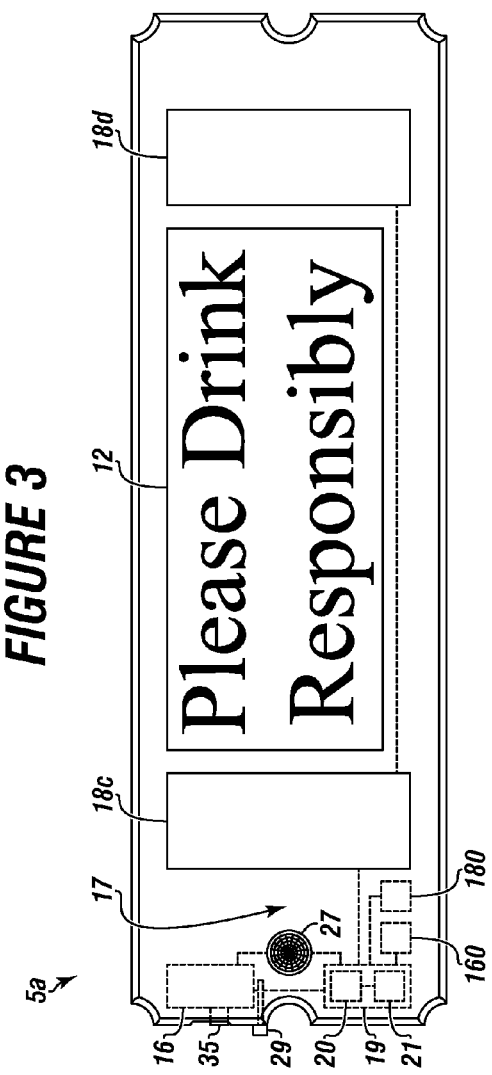
FIG. 3 depicts a back view of one of the plurality of portable collaborative lighting devices.

FIG. 2 depicts a front view of one of the plurality of portable collaborative lighting devices. FIG. 3 shows an opposite side of the portable collaborative lighting device of FIG. 2.

In this embodiment, one of the plurality of portable collaborative light devices 5a can have a substrate 13, which can be flexible and can be made of a plastic. The plastic can be clear and transparent. The plastic can also be a crystalline polypropylene or homopolymer of polyethylene that can withstand temperatures up to about 112 Fahrenheit without deforming or melting.

The substrate 13 can have a first side 14, which can have an identification code 15, which can be non-removable. The identification code 15 can be intended to not only be readable by a scanner, such as a bar code, but can be readable or scanned by a human.

The substrate 13 can have a power source 16, such as a battery.

The power source 16 can be a kinetic energy powered battery, a fuel cell, a thermal power source, a lithium-ion battery, a solar panel connected to a battery, a zinc air battery, a button cell battery, a Tesla coil, a printed battery, a battery made of organic matter, an alkaline battery, similar batteries known in the art, and combinations thereof.

A plurality of lighting devices 18a-18d can be disposed on the first side 14, the second side 17, or both sides of the plurality of portable collaborative lighting devices.

In embodiments, the plurality of lighting devices can include but are not limited to a light 18a, a chemi-luminescent lighting device 18b, a thermal based illumination device 18c, and a chemical based illumination device 18d.

The plurality of lighting devices 18a-18d can be the same color, different colors, or multicolored.

If one of the plurality of lighting devices is a light, the light can be connected to the power source 16. The light or plurality of lighting devices can be connected in series, in parallel, or in combinations thereof.

The lighting effect can be pulsed based on the beat or tempo of the music. The plurality of lighting devices can be individually preprogrammed lighting devices with flashing sequences. The plurality of lighting devices can be operated based on a seat location and can be based on the audio sequence of the event.

In an embodiment, certain lighting devices on certain portable collaborative lighting devices can operate based on the performer, such as group A can operate during the drumbeat sequence, provided by a drummer of the event and group B can operate during the bass music frequency, provided by a bassist of the event.

The plurality of lighting devices can change in intensity, color, pulsation, on/off signaling based on the mood of the music, the tempo of the music and the dynamic of the music.

The colors of the plurality of lighting devices can further be operated based on sponsorships of the venue.

A sensor 27 is depicted, which can be connected to the power source 16 and the programmable logic circuit 19.

The sensor 27 can be a motion sensor, a frequency sensor, a thermal sensor, an orientation sensor, a velocity sensor, a time sensor, a location sensor, pressure sensor, a rotation sensor, a proximity sensor, an ambient light sensor, a contact sensor and combinations thereof.

In embodiments, each of the plurality of portable collaborative lighting devices 5a can have a switch 35 for actuating the lighting effect using the lights.

In embodiments, each of the plurality of portable collaborative lighting devices can also have an expiration date 45 and a no re-entry code 50 printed on the substrate 13.

A programmable logic circuit 19 can also be connected to the plurality of lighting devices. The programmable logic circuit 19 can be in communication with the power source 16.

The programmable logic circuit 19 can also include a device processor 20 and a device data storage 21.

An on/off button 29 is also depicted for the substrate 13. In embodiments, once the on/off button 29 is actuated, the power source 16 will power the programmable logic circuit 19 and the circuit will initiate the lighting effect.

In embodiments, a GPS sensor 160 can be mounted to the substrate 13 and connected to the programmable logic circuit 19 for identifying a geographic location of each of the plurality of portable collaborative lighting device 5a at the event.

In embodiments, the GPS sensor 160 can be mounted to the substrate 13 and connected to the programmable logic circuit 19 for identifying a geographic location of the individual portable collaborative lighting device at the event.

In embodiments, a radio frequency identification device (RFID) 180 can be connected to the programmable logic circuit 19 and configured to transmit a signal from a first portable collaborative lighting device to a second portable collaborative lighting device at an event.

In embodiments, the second side 17 can support a marketing message 12, such as "PLEASE DRINK RESPONSIBLY".

Figure 4B:
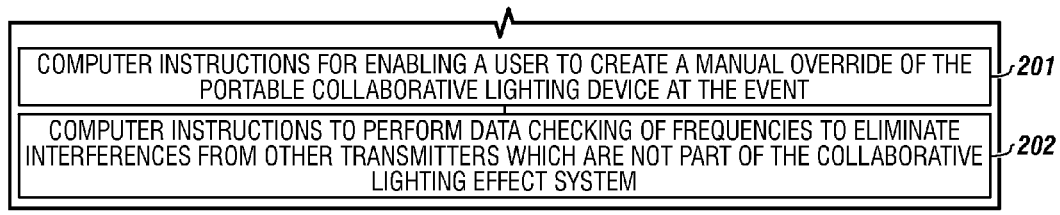

FIGS. 4A and 4B depict the device processor with the device data storage of the plurality of portable collaborative lighting devices.

The device processor 20 can contain the device data storage 21.

The device data storage 21 can include computer instructions 22 to instruct the device processor to operate at least one lighting device in a predetermined sequence.

In embodiments, a predetermined sequence can be a bass music frequency, a treble music frequency, a sequence of pitches, a drumbeat sequence, or combinations thereof.

The device data storage 21 can include computer instructions 37 to instruct the device processor to operate at least one lighting device using a base music frequency.

The device data storage 21 can include computer instructions 39 to instruct the device processor to operate at least one lighting device using a treble music frequency.

The device data storage 21 can include computer instructions 41 to instruct the device processor to operate at least one of lighting device using a sequence of pitches.

The device data storage 21 can include computer instructions 43 to instruct the device processor to operate at least one lighting device using a drumbeat sequence.

The device data storage 21 can include computer instructions 100 to detect a plurality of portable collaborative lighting devices within a preset distance 142.

The device data storage 21 can include computer instructions 102 to synchronize the detected plurality of portable collaborative lighting devices into a crowd map.

The device data storage 21 can include crowd maps 105, a plurality of static graphic patterns 120, a plurality of static text messages 121, a plurality of moving graphic patterns 122, a plurality of moving text messages 123, and a plurality of videos 124 stored therein.

The device data storage 21 can include computer instructions 126 to instruct the device processor to pulse at least one lighting device using a real time light pulsing sequence created during an event provided from an event processor with event data storage connected to the network.

The device data storage 21 can include computer instructions 134 to detect frequency sequences emitted from another portable collaborative lighting device using at least one sensor.

The device data storage 21 can include computer instructions 154 to provide different preprogramed lighting sequences to the plurality of portable collaborative lighting devices simultaneously.

The device data storage 21 can include computer instructions 156 to enable a graphic image, text message, or video to move from a first location on the crowd maps to a second location on at least one of the crowd maps.

The device data storage 21 can include computer instructions 162 to determine the location of an individual portable collaborative lighting device to other individual portable collaborative lighting devices at an event.

The device data storage 21 can include computer instructions 164 to adjust pixels of at least one lighting device changing a color or a light intensity of the individual portable collaborative lighting device when the individual portable collaborative lighting device is moved at an event.

The device data storage 21 can include computer instructions 170 to turn on or off lighting devices of the second portable collaborative lighting device in real time at an event.

In embodiments, the device data storage can include a first location, a second location or both the first location and the second location.

The device data storage 21 can include computer instructions 201 for enabling a user to create a manual override of the plurality of portable collaborative lighting devices at the event.

The device data storage 21 can include computer instructions 202 to perform data checking of frequencies to eliminate interferences from other transmitters which are not part of the collaborative lighting effect system.

Figure 5:
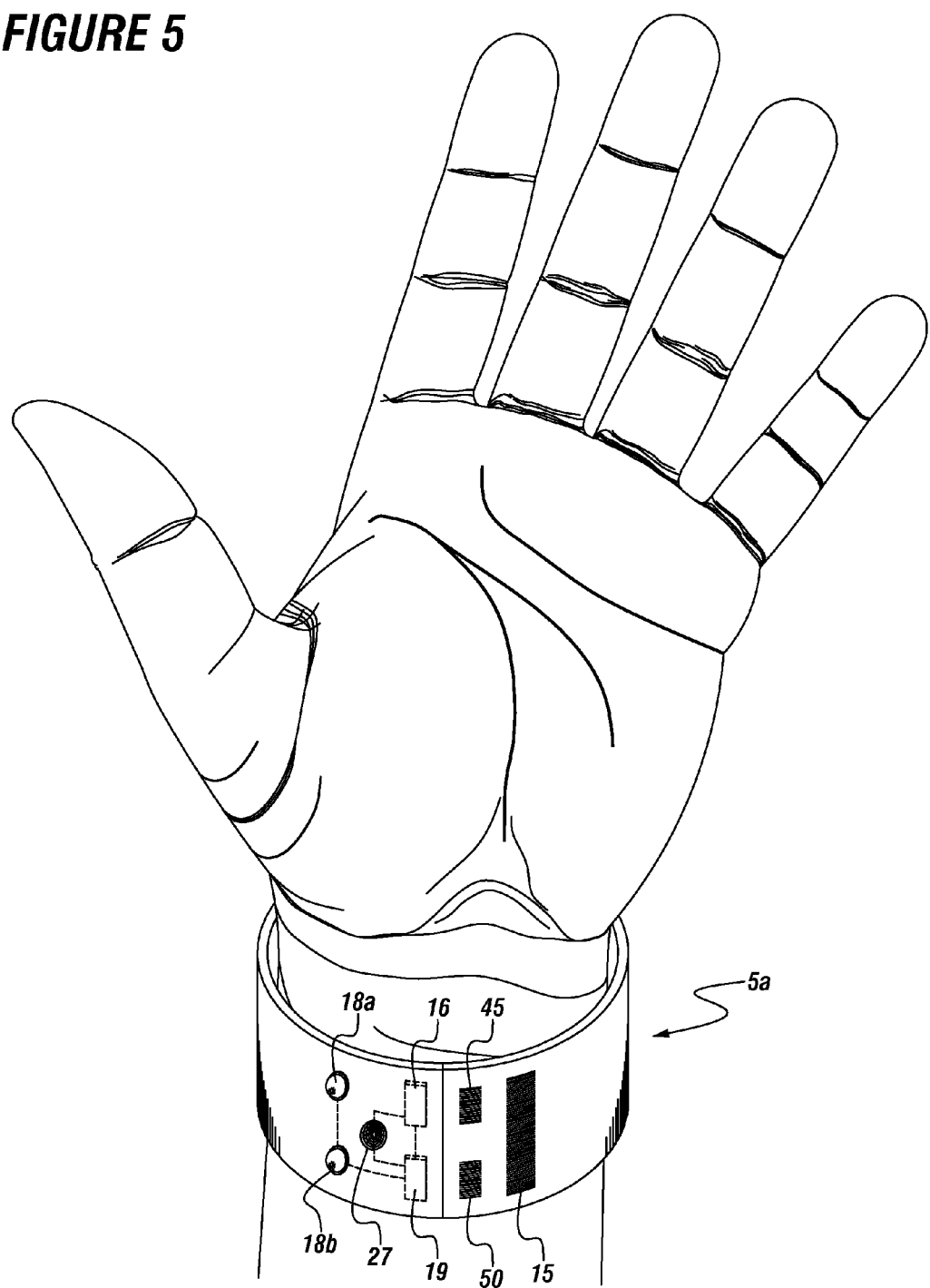
FIG. 5 shows an embodiment of the portable collaborative lighting device, wherein the portable collaborative lighting device is a wristband.

FIG. 5 shows an embodiment of the portable collaborative lighting device, wherein the portable collaborative lighting device is a wristband.

The wristband version of at least one of the plurality of portable collaborative lighting devices 5a is further shown with a first lighting device 18a and a second lighting device 18b in communication with the programmable logic circuit 19.

Also shown are the sensor 27, which can be a motion sensor, the expiration date 45 the no re-entry code 50, and the identification code 15.

The first lighting device 18a can be connected to the power source 16. In embodiments, the first lighting device can be a thermal based illumination device or a chemical based illumination device.

FIG. 6 depicts a diagram of an event processor and an event data storage.

An event processor 130 can be connected to an event data storage 132 and a light board 175.

An event processor 130 and the light board 175 can be connected to or in communication with the network transmitter 33 that can communicate to the plurality of portable collaborative lighting devices. The light board 175 can control the plurality of lighting devices of the plurality of portable collaborative lighting devices at the event.

In embodiments, the event processor, which can be a computer, can be connected to or in communication with the network.

The event data storage 132 can include crowd maps 105.

The event data storage 132 can include a designated zone 140 of members of the audience, such as a VIP section based on a preset area, a zone of seats, or a preset list of individual seats.

The event data storage 132 can include the preset distance 142 from at least one of: a member of the audience, an object, and a fixture, such as 60 feet.

The event data storage 132 can include a geographic direction 144 selected from at least one of: an orientation on or between North, South, East and West, from at least one of: a member of the audience, an object, and a fixture.

The event data storage 132 can include an altitude 146 from at least one of: a member of the audience, an object, and a fixture, such as at the height of balloon drop.

The event data storage 132 can include a random number generator 147.

The event data storage 132 can include an event processor generated random distance 148 from at least one of: a member of the audience, an object, and a fixture, based on the random number generator 147.

The event data storage 132 contains computer instructions, such as a random generator that creates random numbers. The random generator can be used to create random distances from the event processor 130. A random distance 148 can be a range, such as from 1 foot to 300 feet from the event processor 130 or other defined object or fixture at the venue.

The event data storage 132 can include computer instructions 190 for producing a shimmer effect using at least a portion of the portable collaborative lighting devices at the event.

The event data storage 132 can include computer instructions 192 for producing a cross fade effect using at least a portion of the portable collaborative lighting devices at the event.

The event data storage 132 can include computer instructions 194 for producing a wave effect using at least a portion of the portable collaborative lighting devices at the event.

The event data storage 132 can include computer instructions 196 for producing a flicker effect using at least a portion of the portable collaborative lighting devices at the event.

The event data storage 132 can include computer instructions 198 for producing a strobe effect using at least a portion of the portable collaborative lighting devices at the event.

The event data storage 132 can include computer instructions 203 for generating at least 8 bit, full color video at 30 frames per second and transmit the video to at least a portion of the portable collaborative lighting devices at the event.

The event data storage 132 can include computer instructions 204 to transfer money units from a financial institution on the network to other portable collaborative lighting devices using encryption technology with an RFID tag, whether active or passive, provides commands.

The event data storage 132 can include computer instructions 205 to activate when an RFID tag, whether active or passive, is configured to transfer money, the RFID tag configured to perform as a credit card, a debit card, or a credit storage device holding money equivalent units from a venue, in exchange of actual cash.

Figure 7:
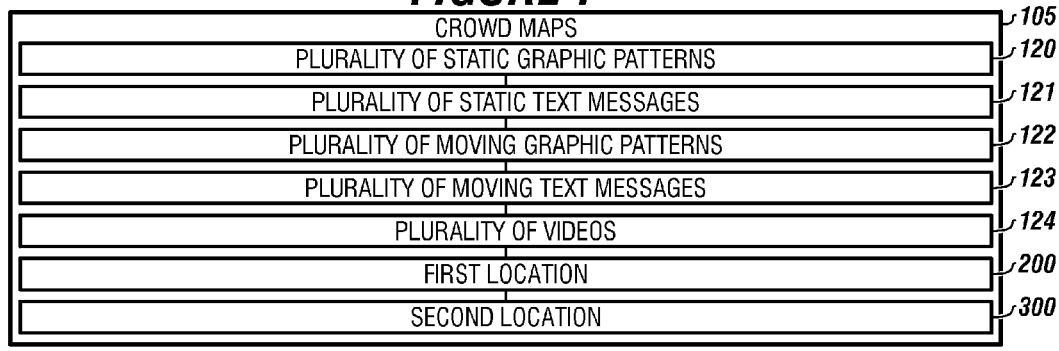
FIG. 7 depicts crowd maps located in the device processor and/or the event processor.

FIG. 7 depicts the crowd maps.

The crowd maps 105 can include the plurality of static graphic patterns 120, which can be deconstructed into individual portable collaborative lighting devices as pixels to create at least one static image using at least one of: a member of the audience, an object, and a fixture.

The crowd maps 105 can include a plurality of static text messages 121, which can be deconstructed into individual portable collaborative lighting devices as pixels to create at least one static image using at least one of: a member of the audience, an object, and a fixture.

The crowd maps 105 can include a plurality of moving graphic patterns 122, which are deconstructed into individual portable collaborative lighting devices as pixels to create at least one moving image using at least one of: a member of the audience, an object, and a fixture.

The crowd maps 105 can include a plurality of moving text messages 123, which can be deconstructed into individual portable collaborative lighting devices as pixels to create at least one moving image using at least one of: a member of the audience, an object, and a fixture.

The crowd maps 105 can include a plurality of videos 124, wherein each video can be deconstructed into individual portable collaborative lighting devices and presented as pixels to create a video using at least one of: a member of the audience, an object, and a fixture.

The crowd maps 105 can also have a first location 200 and a second location 300.

Figure 8:
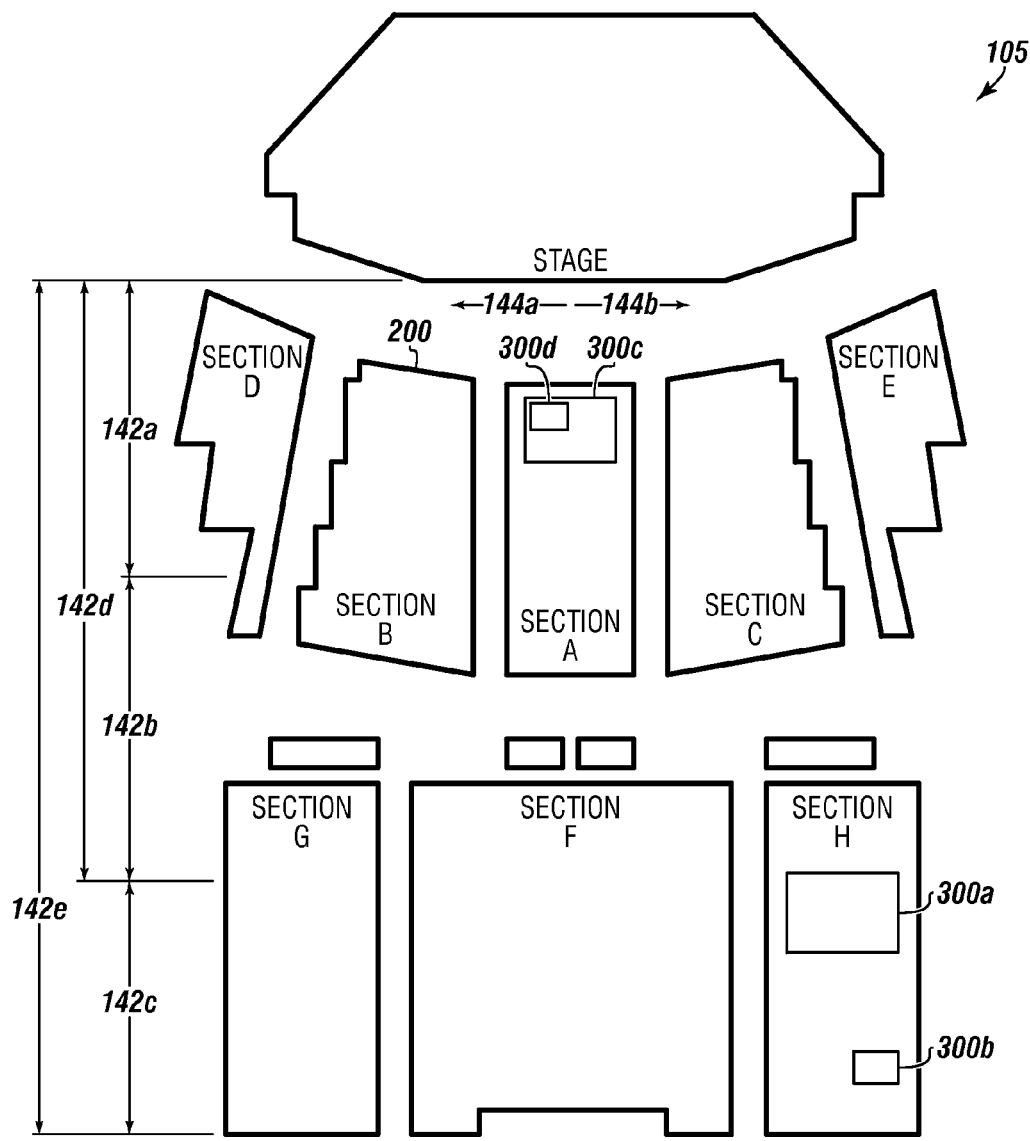
FIG. 8 depicts a map of the venue showing the first location and the second location in the crowd maps.

FIG. 8 depicts a map of the venue showing the first location and the second location in the crowd maps.

The first location 200, in Section B, and a plurality of second locations 300a, 300b, 300c and 300d are shown on the crowd map of the venue.

In embodiments, a video, a graphic or a text can move from the first location 200 to the second locations 300a, 300b, 300c, and 300d, or the can all be moved to simultaneously.

A plurality of preset distances 142a, 142b, 142c, 142d and 142e are shown. Each preset distance can be different from another preset distance.

Geographic directions 144a and 144b selected from at least one of: a compass bearing of North, South, East or West or a compass bearing between pairs of compass bearings, from at least one of: a member of the audience at the event, an object at the event, and a fixture at the event.

Figure 9:
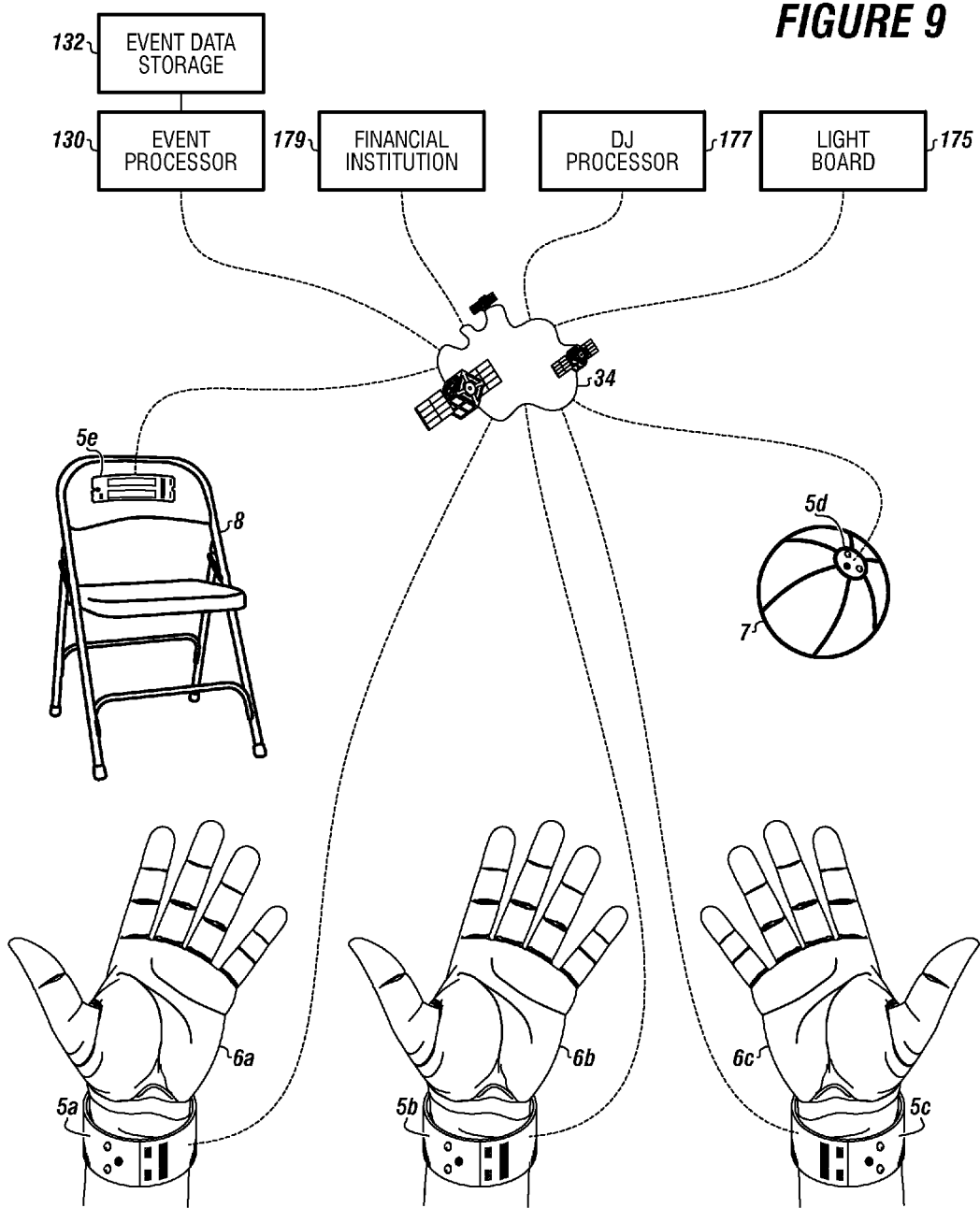
FIG. 9 depicts the system usable with the plurality of portable collaborative lighting devices for the lighting effect.

FIG. 9 depicts the system usable with the plurality of portable collaborative lighting devices for the lighting effect.

The system can include the event processor 130 with the event data storage 132, a financial institution 179, a DJ processor 177 and the light board 175 in communication with the network 34 relay the lighting effect to the plurality of portable collaborative lighting devices 5a, 5b, 5c, 5d and 5e of the members of the audience 6a, 6b, and 6c, the object 7 and the fixture 8.

For example, Rick and a group of friends have very different tastes in music. They'll be at the same music festival but are listening to different bands throughout the day. They decide to meet up to watch Jonny Gray for his show that evening because he is everyone's favorite. The day before the show, Rick used the festival App and organized his schedule. Thirty minutes before each show, his wristband flashes three times reminding him that his next show is coming up. Because the group predetermined that they wanted to meet up together to see Jonny Gray, the circle of LEDs on each friend's wristband begins to flash prior to the show. Rick is facing north and his friends are south of him, so the LED closest to his friends lights up signaling for Rick to turn around. Because Rick is more than 100 meters from his closest friend, the signaling LED that is closest to his group is flashing blue. As he gets closer, the LED changes to green, then yellow. Rick missed the meet up time and the group begins to move towards the stage without him. This is not a problem for Rick as his wristband vibrates gently to let him know his trajectory has changed. The LEDs now instruct him to make a slight left turn. As he approaches the group his wristband begins flashing red as do the earplugs he is still wearing from the last show. He has arrived. In this way, the plurality of portable collaborative lighting devices can serve as a guiding compass, directing individuals through the crowd map.

In another embodiment, the plurality of portable collaborative lighting devices can function using an inertial navigation system (INS). An inertial navigation system is a navigation aid that uses a computer, motion sensors, such as accelerometers, and rotational sensors, such as gyroscopes to continuously calculate via dead reckoning the position, orientation, and velocity of a moving object without the need of external references. It is used on vehicles such as ships, aircraft, submarines, guided missiles and spacecraft, as well as on the Lamborghini Huracán. Other terms used to refer to inertial navigation systems or closely related devices include inertial guidance system, inertial reference platform, inertial instrument, inertial measurement units (IMU) and many other variations.

The corresponding term for inertial navigation systems in biology, used to describe the processes by which animals update their estimates of position or heading, is path integration. Many animals, such as ants, rodents and geese, use path integration to continuously track their current location based on their movements from a starting point or their last known location.

For example, Mettie Faye is a blind woman that loves attending live music events because she can feel the music through vibrations. In this embodiment, Mettie receives two earbuds in association with her ticket to the event. She places one wearable device in her right ear and one wearable device in her left ear and proceeds through the entry gate, which records her entry time and position and then begins to use dead reckoning to track her position. Using dead reckoning, the portable collaborative lighting device uses the entry gate as the first position and then calculates positioning using the previously determined position, or fix, and advancing that position based upon known or estimated speeds over elapsed time and course. Because Mettie is blind, her earbuds also provide her navigational instructions using vibrations. When Mettie's grandson purchased her event ticket using an App on his phone, he selected 'blind' from the list of device features and activated the built in logic instructions for guiding an individual through a crowd map using accurate directional information. In Mettie's case, a faint vibration indicates to walk forward and as she walks forward, two quick vibrations on either side indicate to the wearer that she is to turn either right or left. Varying vibrational intensities determine the speed, degree or urgency of the required turn for the device wearer. The portable collaborative lighting device calculates directional information using accurate real time data from the other portable collaborative lighting devices. This is similar to the way the Waze App collaborates real time data from devices in vehicles to determine the fastest route to a specified location. In the same way, Mettie is able to navigate around the event and be guided to preselected shows on different stages throughout the day as directed by the portable collaborative lighting device.

The invention includes an embodiment wherein the substrate to enhance the performance, would provide other sensory simulation including but not limited to taste, touch, smell, sound and feel. An example would be a lighting device that vibrates to the beat of the music, or a drone that hovers above the audience with a reservoir of chemical smell and then mists a popcorn smell during a song about popcorn. Another example is a wristband wherein the substrate talks to the wearer, like a "Siri" talks to an owner of a smart cell phone.

As the term is used herein, the word "tag" can also refer to a "chip".

In embodiments, the plurality of portable collaborative lighting devices have either a passive RFID tag or an active RFID tag which can be used to automatically identify and capture data about a venue, about paying for a ticket, and about the wearer of the plurality of portable collaborative lighting devices.

In embodiments, individuals can upload personal identification information onto an RFID tag attached or embedded in the plurality of portable collaborative lighting devices, such as automatically, which enables the individual user to notify a drink counter automatically that the wearer is over/under age to acquire the drink.

With RFID tags, individuals can upload bank data onto the RFID tag so that the plurality of portable collaborative lighting devices can be used to make purchases at the venue, such as to pay for food at the venue.

For example, Betsy gets her portable collaborative lighting device as a wristband in the mail ahead of an event. By simply taking the unique code associated with this wristband, she can upload her payment data onto the wristband using any of the following methods: a website, an app, or through a call center. (If she had waited to get her wristband on the day of an event, she could also do this in real time). Depending upon which method she selects, she can get payment ability onto her wristband by uploading debit/credit card info directly (photo/scan or manual entry) or by connecting her wristband to a third party payment platform such as APPLEPAY™ or PAYPAL™. Single step device activation is possible by registration with social integration or social media sites.

After uploading payment info, her identity can be confirmed by scanning her photo ID with her phone. This means that she is automatically age qualified for purchases such as alcohol, etc. Because the device has location and proximity sensors, Betsy can be enjoying a show at a festival without having to go to the concession stand and leave the blanket she and her friends have spread out on the grass, she can place an order for a cold beer on her phone, verify her identity/age, pay for it in real time using the payment data attached to her wristband's RFID sensor and then have the beverage delivered via drone to her exact location (identified via the location and/or proximity sensors embedded in the wristband).

After Betsy orders her beverage of choice, the concert has to accept payment and deliver the goods. If Betsy is ordering at the concession stand, she can simply wave her wristband in front of the proximity sensor to verify payment. Because her ID is also scanned, her age verification pops up along with a photo image that can be confirmed by the concession attendant. There are various encrypted ways that payment can be taken, including the use of a number of smart device mobile scanners.

In other embodiments, a wearer can obtain the plurality of portable collaborative lighting devices at the door of the venue in the form of ear buds, a hat, a T-shirt, a foam stick, a towel, a neck land yard.

The RFID tag embodiment enables individuals at the venue to order food and/or drinks via their phone and have the items delivered based on an active RFID tag transmitting the location of the wearer, such as a GPS location at the venue.

In embodiments, the RFID tag, whether active or passive, can be configured to transfer money units to other portable collaborative lighting device, such as wristbands using encryption technology. Credit card information can be uploaded into the RFID tag enabling the RFID tag to act as a credit card. In another embodiment, the RFID tag can hold money, like a debit card with a pin code. The RFID tag can hold credits from a venue, instead of actual cash.

For example, a parent at the venue can have a first portable collaborative lighting device and a child at the same venue can have a second portable collaborative lighting device, computer instructions in the portable collaborative lighting devices can enable the first user or parent to provide money credits to the second user, or child.

In embodiments, each of the plurality of portable collaborative lighting devices can be any device that completes a circuit, and when the circuit is disconnected, all financial information and private information can be automatically erased.

In embodiments, the RFID tag, whether active or passive can be used to confirm the wearer identity at a security gate and allow entrance by the wearer into restricted areas, such as a Hotel room, a VIP section, or a back stage area, based on a priority code embedded in the RFID tag.

In embodiments, the plurality of portable collaborative lighting devices can configure lighting changes depending on where the user is positioned in the venue. For example, the plurality of portable collaborative lighting devices can identify with the RFID tag a location on a grid created by an administrative processor at the venue. By knowing where the user is located on the grid in the venue enables different lighting changes in the plurality of portable collaborative lighting devices to be created and performed.

In embodiments, computer instructions can enable the RFID tag to identify the tag's location with respect to other plurality of portable collaborative lighting devices with the RFID tag. For example, a portable collaborative lighting device proximity sensor could detect another portable collaborative lighting device in range and to locate other user known by a first user at the venue. This proximity sensor detection can be linked to an application, such as a mobile application, which can have a compass and allow a user to map a location of a nearby user enabling the wearer to walk towards the other user given the compass direction.

In embodiments, computer instructions can enable RFID tags to know where a user is located in a venue in order to track and change traffic patterns in the venue.

For example, Sam is at a music festival and feeling very thirsty. He also needs to use the restroom, so he decides to go find the nearest portable toilet and then get a drink at the concession stand. On his way to the restroom, he notices that the drink line is looking very long. He arrives at the row of portable toilets and quickly identifies an empty one by the green light shining on the door. The portable toilets that are occupied are showing a red light and those that are unlocked, but still have someone in them, are showing a yellow light. Sam just has to urinate, so he does not lock the door meaning the light on the port-a-potty he is using never turns red, but it still notifies others that it is occupied because the light turns yellow when he is inside. When he is done relieving himself, he decides to go to the concession stand, but instead of going to the one with the long line he saw before, he consults his wristband for directions. The wristband, which is attached to the whole network and understands traffic patterns, informs him that there is a concession stand around the corner with no line. He follows the directions his wristband gives him and does not have to wait at all. Once the concert is over at the end of the day, the same wristband helps the flow of traffic when exiting the venue by redirecting Sam through a second exit that is closer to his car. In this way, the portable collaborative lighting device can help save time by understanding traffic patterns and interpreting that into individual direction sets for the event goers.

In embodiments, the plurality of portable collaborative lighting devices receive commands from the DJ processor, such as a DJ with an auxiliary computer or computer instructions that act like a DJ stored in the auxiliary computer connected to the network.

In embodiments, the plurality of portable collaborative lighting devices are sound controlled, that is at least one of the portable collaborative lighting devices contains a sound receiver, such as a microphone, with processor and computer instructions to receive ambient sounds, and change color relative to the ambient sounds. For example, the wristband lights can pulse to the sound of the music. In embodiments, some individuals can have a plurality of lighting devices connected to bass sounds, other individuals can have a plurality of lighting devices connected to treble sounds, making the device a self-listening device. This plurality of lighting devices enables a deaf person to enjoy a rock concert better.

In embodiments, the plurality of portable collaborative lighting devices can be a cellular phone, a smartphone, a tablet, a wearable computer, a smart watch with watch processor and watch data storage, a smart bracelet with bracelet processor and bracelet data storage, or a personal digital assistant.

In embodiments, the plurality of portable collaborative lighting devices can provide pre-programmed lighting sequences which are pre-programmed before being obtained by the wearer. The pre-programmed lighting sequences can be programmed into a microprocessor on the substrate that is connected to the lights of the plurality of portable collaborative lighting devices.

In embodiments, the plurality of portable collaborative lighting devices can provide sensations to the wearer which control the directions of movement of the wearer, such as certain vibrations are generated and the wearer is to turn left. Different vibrations generated cause the wearer to turn right. The vibrations can be generated by a vibrator mounted to the substrate like a smart phone vibrates, or an alarm clock vibrates, and connected to the power supply and computer instructions that actuate the vibrator. The vibrator can be one like a beeper or a pager.

In embodiments, the plurality of portable collaborative lighting devices can include a light that projects light in patterns onto an arm of the wearer. Computer instructions to project light patterns can originate as preprogrammed into the processor of the device, or from a DJ processor with an auxiliary computer, or from a central computer having the patterns stored in the data storage. The patterns geometric image, still or moving images, or color sequence or an array of colors presented simultaneously.

In embodiments, the plurality of portable collaborative lighting devices can include a micro-dose administering device to provide a drug like caffeine to the skin of the wearer, akin to a transdermal patch that is triggered to release a drug by a time of day or the dropping vital signs that fall below preprogrammed limits.

In other embodiments, the plurality of portable collaborative lighting devices can monitor state of health of a user and administer sugar if heart rate drops.

In embodiments, the plurality of portable collaborative lighting devices can be kinetic powered devices without the need for a battery, fuel cell or solar cell.

In embodiments, the lighting device is at least one of: a liquid crystal display (LCD), a light emitting diode (LED), organic plurality of portable collaborative lighting devices (OLED), polymer light emitting diodes, bioluminescence, radioluminescene, triboluminescence, sonoluminescense, light emitting electrochemical cells, electro luminesecent sheets and wires, neon lamps, electro luminescene, (EL), an electro luminescent panel (ELP), Thin Film Electro Luminescent Panel (TFELP), and a plasma based lighting device.

While these embodiments have been described with emphasis on the embodiments, it should be understood that within the scope of the appended claims, the embodiments might be practiced other than as specifically described herein.

What is claimed is:

1. A collaborative lighting effect system for an event at a venue, comprising:
  a. a network; and
  b. a plurality of portable collaborative lighting devices in communication with the network, each portable collaborative lighting device of the plurality of portable collaborative lighting devices configured to be attached to at least one of: a member of the audience, an object at the event, and a fixture at the event, wherein each portable collaborative lighting device of the plurality of portable collaborative lighting devices comprising:
     (i) a substrate;
     (ii) a power source attached to the substrate;
     (iii) at least one sensor connected to the power source and connected to the substrate;
     (iv) a plurality of lighting devices, wherein the plurality of lighting devices are at least one of: a light connected to the power source, a thermal based illumination device, and a chemical based illumination device;
     (v) a programmable logic circuit having a device processor with a device data storage, wherein the data storage comprises a non-transitory data storage medium and the data storage is connected to the power source, the at least one sensor, and at least one of the plurality of lighting devices, wherein the device data storage comprises computer instructions to instruct the device processor to do at least one of:

1. operate the at least one lighting device in a predetermined sequence; or
2. detect the plurality of portable collaborative lighting devices within a preset distance;

(vi) computer instructions in the device data storage to instruct the device processor to:
1. synchronize the detected plurality of portable collaborative lighting device into crowd maps, wherein at least one crowd map of the crowd maps comprising at least one of:
   a. a plurality of static graphic patterns which are deconstructed into individual portable collaborative lighting devices as pixels using at least one of: individual portable collaborative lighting devices on the member of the audience, individual portable collaborative lighting devices on the object at the event, and individual portable collaborative lighting devices on the fixture at the event;
   b. a plurality of static text messages which are deconstructed into individual portable collaborative lighting devices as pixels using at least one of: individual portable collaborative lighting devices on the member of the audience, individual portable collaborative lighting devices on the object at the event, and individual portable collaborative lighting devices on the fixture at the event;
   c. a plurality of moving graphic patterns which are deconstructed into individual portable collaborative lighting devices as pixels using at least one of: individual portable collaborative lighting devices on the member of the audience, individual portable collaborative lighting devices on the object at the event, and individual portable collaborative lighting devices on the fixture at the event;
   d. a plurality of moving text messages which are deconstructed into individual portable collaborative lighting devices as using at least one of: individual portable collaborative lighting devices on the member of the audience, individual portable collaborative lighting devices on the object at the event, and individual portable collaborative lighting devices on the fixture at the event; and
   e. a plurality videos, each video when deconstructed into individual portable collaborative lighting devices is presented as pixels using at least one of: individual portable collaborative lighting devices on the member of the audience, individual portable collaborative lighting devices on the object at the event, and individual portable collaborative lighting devices on the fixture at the event;

(vi) pulse at least one lighting device of the plurality of lighting devices using a real time light pulsing sequence created during the collaborative lighting effect system for the event provided from an event processor with an event data storage connected to the network; and (viii) detect frequency sequences emitted from another portable collaborative lighting device for the event using the at least one sensor.

2. The collaborative lighting effect system of claim 1, wherein the event data storage further comprises at least one of:
   b. a designated zone at the collaborative lighting effect system for the event;
   c. the preset distance from at least one of: the member of the audience, the object at the event, and the fixture at the event;
   d. a geographic direction selected from at least one of: a compass bearing of North, South, East or West or a compass bearing between pairs of compass bearings, from at least one of: the member of the audience, the object at the event, and the fixture at the event;
   e. an altitude from at least one of: the member of the audience, the object at the event, and the fixture at the event; and
   f. a random number generator to produce a random distance from at least one of: the member of the audience, the object at the event, and the fixture at the event.

3. The collaborative lighting effect system of claim 2, comprising the crowd maps in the device data storage and the event data storage and computer instructions in the device data storage enabling a graphic image, a text message, or a video to move from a first location to a second location on the crowd maps.

4. The collaborative lighting effect system of claim 3, wherein the device data storage comprises computer instructions providing different preprogramed lighting sequences to the plurality of portable collaborative lighting devices simultaneously.

5. The collaborative lighting effect system of claim 1, wherein each of the portable collaborative lighting devices of the plurality of portable collaborative lighting devices is a cellular phone, a smart phone, a tablet, a wearable computer, a smart watch with a watch processor and a watch data storage, a smart bracelet with a bracelet processor and a bracelet data storage, or a personal digital assistant.

6. The collaborative lighting effect system of claim 1, wherein the substrate is at least one of: a wristband, a ball, a beach ball, an eyeglass frame, a balloon, a flag, a sticker, a lantern, a flashlight, a non-powered flying device, a parachute attached to a translucent material, a kite, a self-propelled flying vehicle, a remote controlled land based or water based vehicle, a sprinkler system, a watch, earplugs, ear phones, ear buds, an umbrella, a raincoat, a bottle, a can, a cup, cutlery, a lanyard, a scarf, a towel, a handkerchief, a stuffed animal, a bubble blowing device, a shirt, a jersey, a sweater, a hoodie, a pair of pajamas, a hat, a belt, a vest, socks, a headband, sandals, gloves, mittens, shoes, shoe laces, a pompom, a jump rope, a musical instrument, a foam stick, an inflatable stick, jewelry, a key chain, a luggage tag, suspenders, an eyeglass lens, and a translucent silicone object.

7. The collaborative lighting effect system of claim 1, wherein each individual portable collaborative lighting device of the plurality of portable collaborative lighting devices further comprise:
   b. a GPS sensor mounted to the substrate and connected to the programmable logic circuit for identifying a geographic location of the individual portable collaborative lighting device at the event; and
   c. computer instructions in the device data storage to instruct the device processor to determine a location of an individual portable collaborative lighting device in measureable units to other individual portable collaborative lighting devices at the event; and
   d. computer instructions in the device data storage to instruct the device processor to adjust pixels of at least one of the plurality of lighting devices changing a color or a light intensity of an an individual portable collaborative lighting device is moved at an event.

8. The collaborative lighting effect system of claim 1, wherein the power source is at least one of: a kinetic energy powered battery, a fuel cell, a thermal power source, a lithium-ion battery, a solar panel connected to a battery, a zinc air battery, a button cell battery, a Tesla coil, a printed battery, a battery made of organic matter, and an alkaline battery.

9. The collaborative lighting effect system of claim 1, wherein the plurality of lighting devices is at least one of: a liquid crystal display (LCD), a light emitting diode (LED), an organic light-emitting diode (OLED), a polymer light emitting diode, bioluminescence, radioluminescene, triboluminescence, sonoluminescence, a light emitting electrochemical cell, electro luminescent sheets and wires, neon lamps, electro luminescence (EL), an electro luminescent panel (ELP), a thin film electro luminescent panel (TFELP), and a plasma based lighting device.

10. The collaborative lighting effect system of claim 1, wherein the event processor with the event data storage connected to the network further communicates with a light board for controlling the plurality of lighting devices of the plurality of portable collaborative lighting devices at the event.

11. The collaborative lighting effect system of claim 1, further comprising a radio frequency indicator device (RFID) connected to the programmable logic circuit of each of the plurality of portable collaborative lighting devices configured to transmit a signal to a second portable collaborative lighting device at an event thereby activating computer instructions in the device data storage of the second portable collaborative lighting device to turn on or off the second collaborative lighting device in real time at the event.

12. The collaborative lighting effect system of claim 1, wherein the crowd maps are transmitted from the event data storage by the event processor to the plurality of portable collaborative lighting devices simultaneously using at least one of:
  b. computer instructions in the event data storage that produces a shimmer effect using at least a portion of the portable collaborative lighting devices at the event;
  c. computer instructions in the event data storage that produces a cross fade effect using at least a portion of the portable collaborative lighting devices at the event;
  d. computer instructions in the event data storage that produces a wave effect using at least a portion of the plurality of portable collaborative lighting devices at the event;
  e. computer instructions in the event data storage that produces a flicker effect using at least a portion of the plurality of portable collaborative lighting devices at the event; and
  f. computer instructions in the event data storage that produces a strobe effect using at least a portion of the plurality of portable collaborative lighting devices at the event.

13. The collaborative lighting effect system of claim 1, comprising computer instructions in the event data storage, generating at least 8 bit, full color video at 30 frames per second and transmit the video to at least a portion of the plurality of the portable lighting devices at the event.

14. The collaborative lighting effect system of claim 1, wherein at least one of: the event processor and the individual portable lighting devices are configured to receive graphic images, text, video or color pulsating sequences.

15. The collaborative lighting effect system of claim 1, wherein the fixture at the event is on a stage at the venue, in a store at the venue, mounted in a restaurant at the venue, mounted to a liquor station at the venue, mounted to a beer station at the venue, positioned in a lounge at the venue, located at entry gates at the venue, located adjacent turnstiles at the venue, located within ceiling fans at the venue, positioned in lamp posts at the venue, located on scoreboards at the venue, mounted to goal posts at the venue, or positioned at entrance ways at the venue.

16. The collaborative lighting effect system of claim 1, wherein the object at the event is movable beer stations, movable liquor stations, portable toilets, shoes, sandals, shirts, hats, clothing, flying discs, movable stages, balls, beach balls, orbs, lanyards, apparel, signage, drones, blimps, movable seats, banners or earplugs.

17. The collaborative lighting effect system of claim 1, wherein the at least one sensor comprises at least one of: a motion sensor, a frequency sensor, a thermal sensor, an orientation sensor, a velocity sensor, a time sensor, a location sensor, a pressure sensor, a rotation sensor, a proximity sensor, an ambient light sensor, and a contact sensor, and wherein the at least one sensor is at least one of: a passive radio frequency identification (RFID) chip or tag and an active radio frequency identification (RFID) chip or tag.

18. The collaborative lighting effect system of claim 17, wherein a GPS location is transmitted by the active radio frequency identification (RFID) chip or tag.

19. The collaborative lighting effect system of claim 17, wherein the passive radio frequency identification (RFID) chip or tag and the active radio frequency identification (RFID) chip or tag are configured to transfer money units from a financial institution processor on the network to other plurality of portable collaborative lighting devices using encryption technology.

20. The collaborative lighting effect system of claim 17, wherein the passive radio frequency identification (RFID) chip or tag and the active radio frequency identification (RFID) chip or tag are configured to transfer money and configured to perform as a credit card, a debit card, or a credit storage device holding money equivalent units from the venue in exchange of actual cash.

21. The collaborative lighting effect system of claim 1, wherein a DJ processor provides commands to the plurality of portable collaborative lighting devices.

* * * * *